(12) United States Patent
Soerensen

(10) Patent No.: US 7,429,348 B2
(45) Date of Patent: Sep. 30, 2008

(54) METHOD FOR THERMOPLASTIC MOULDING OF A TUBULAR ITEM, A TUBULAR ITEM AND AN INJECTION MOULD WITH A ROTATING CORE

(75) Inventor: Niels Soerensen, Brabrand (DK)

(73) Assignee: HP Industrial A/S, Galten (DK)

( * ) Notice: Subject to any disclaimer, the term of this patent is extended or adjusted under 35 U.S.C. 154(b) by 460 days.

(21) Appl. No.: 10/512,203

(22) PCT Filed: Sep. 20, 2002

(86) PCT No.: PCT/DK02/00611

§ 371 (c)(1),
(2), (4) Date: Oct. 22, 2004

(87) PCT Pub. No.: WO03/090991

PCT Pub. Date: Nov. 6, 2003

(65) Prior Publication Data
US 2005/0112309 A1    May 26, 2005

(30) Foreign Application Priority Data
Apr. 23, 2002   (DK) ............................... 2002 00604

(51) Int. Cl.
*B29C 45/36* (2006.01)

(52) U.S. Cl. ................................... 264/328.1; 425/577
(58) Field of Classification Search .................. None
See application file for complete search history.

(56) References Cited

U.S. PATENT DOCUMENTS

| 4,345,351 A | | 8/1982 | Moss et al. | |
|---|---|---|---|---|
| 5,240,397 A | * | 8/1993 | Fay et al. | ..................... 425/145 |
| 5,352,398 A | * | 10/1994 | Crowe | ......................... 264/219 |
| 5,983,455 A | * | 11/1999 | Polzin et al. | ................... 16/429 |

FOREIGN PATENT DOCUMENTS

| EP | 0 395 805 A1 | 11/1990 |
|---|---|---|
| EP | 0 872 311 A2 | 10/1998 |
| EP | 0 901 887 A1 | 3/1999 |
| JP | 6-126780 A | 5/1994 |
| JP | 7-009495 A | 1/1995 |
| WO | WO 91/08803 A1 | 6/1991 |
| WO | WO 02/18802 A1 | 3/2002 |
| WO | WO 02/34494 A1 | 5/2002 |

* cited by examiner

*Primary Examiner*—Monica A Huson
(74) *Attorney, Agent, or Firm*—David S. Safran

(57) ABSTRACT

A method for compact injection moulding of a long, tubular thermoplastic item with an at least partly through-going hole longitudinally of the item made by means of mould core, where the mould core rotates during the moulding.

14 Claims, 4 Drawing Sheets

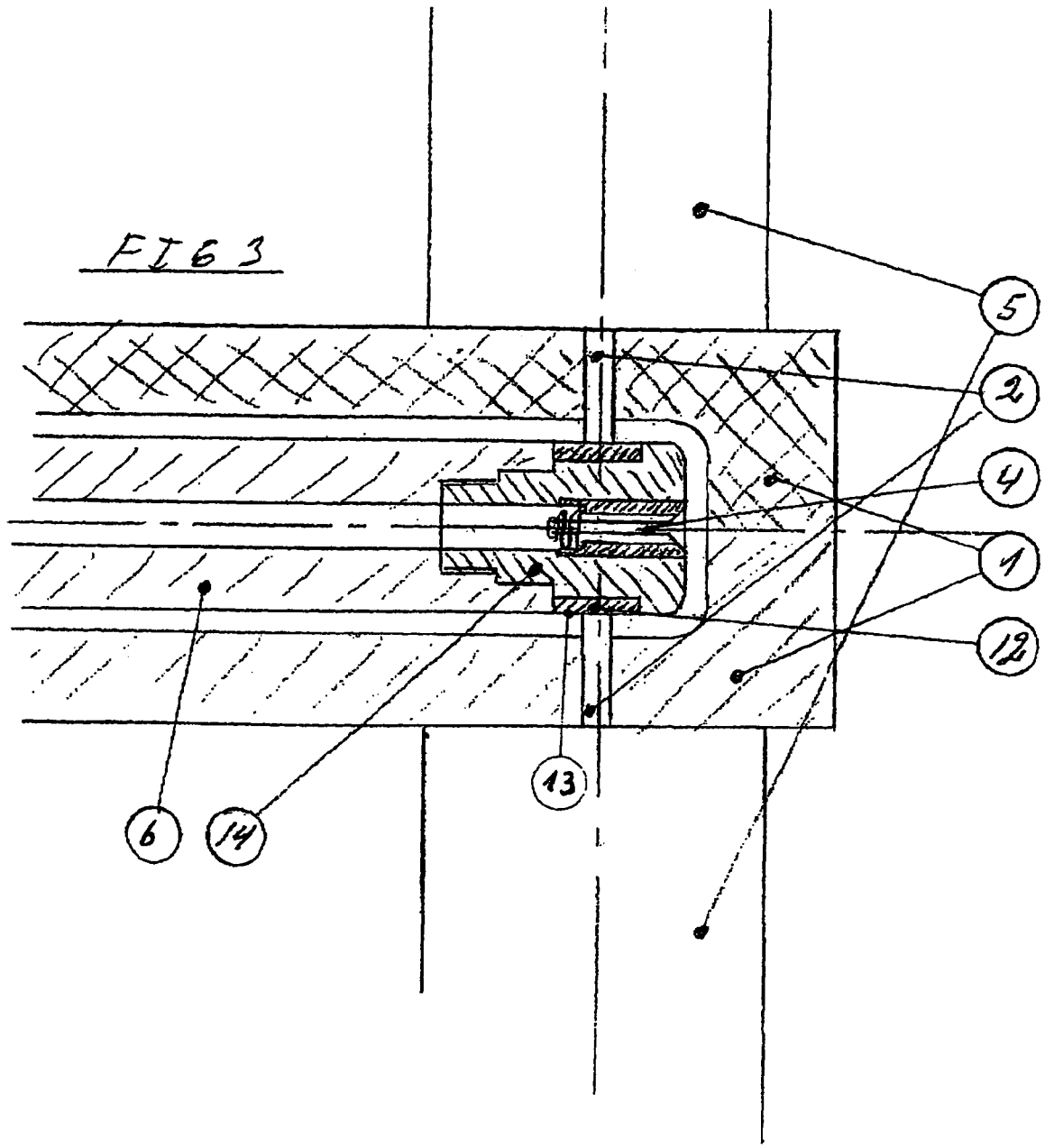

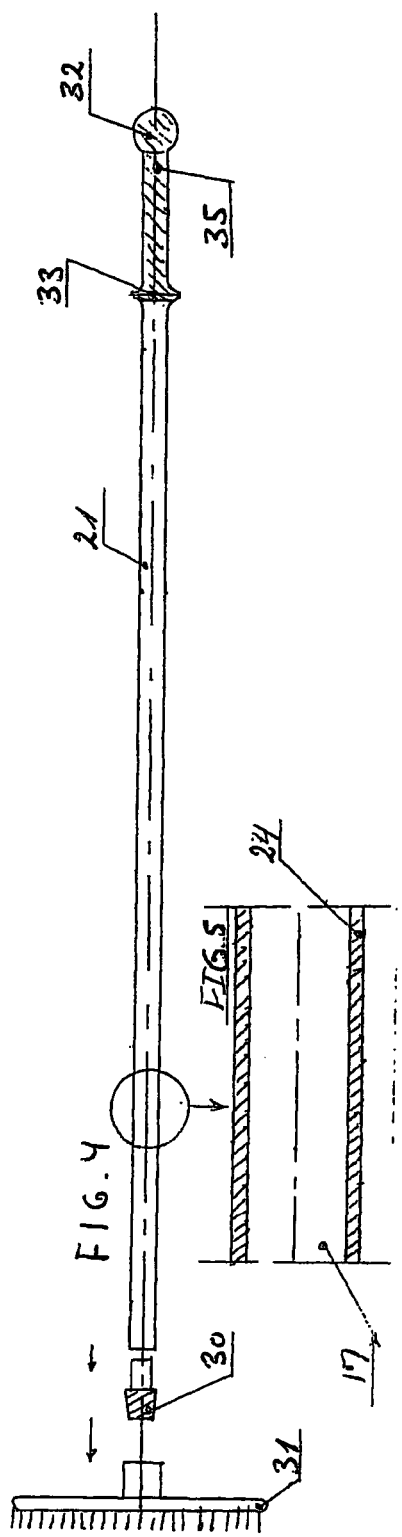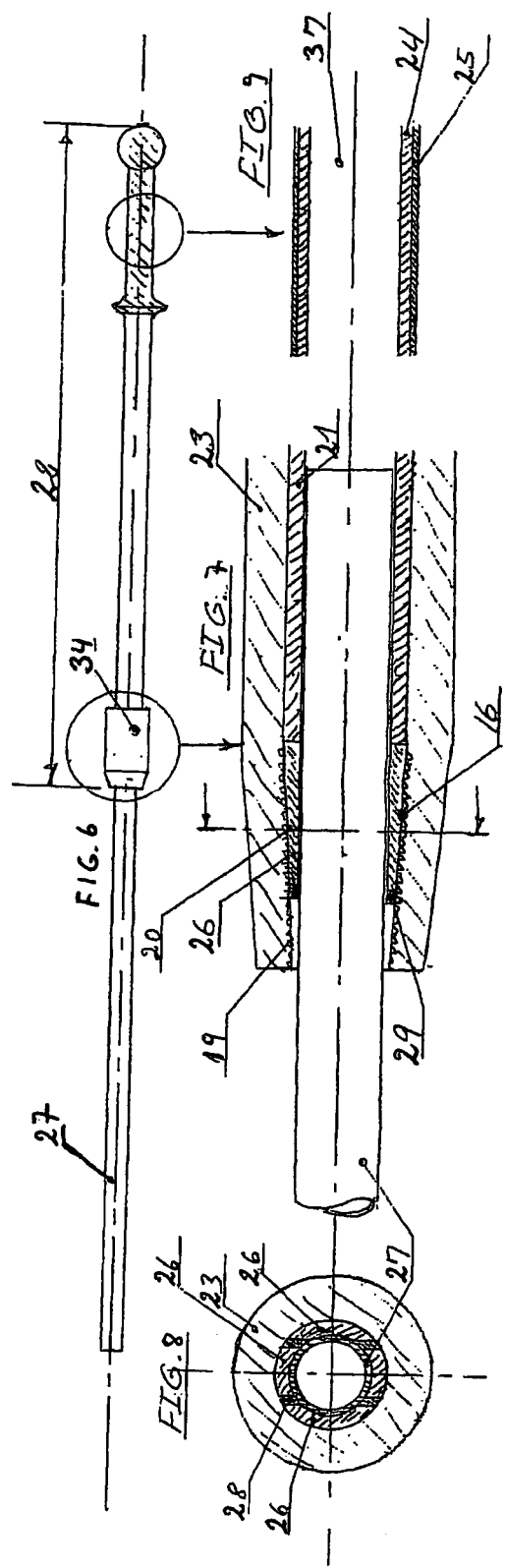

METHOD FOR THERMOPLASTIC MOULDING OF A TUBULAR ITEM, A TUBULAR ITEM AND AN INJECTION MOULD WITH A ROTATING CORE

BACKGROUND OF THE INVENTION

1. Field of Invention the present invention concerns a method for making a long tubular thermoplastic item with bottom at one end.

2. Description of Related Art

Long tubular thermoplastic items, e.g. with bottom at one end, may be used for many purposes, e.g. for pneumatic cylinders, scaffolding rods, structural elements for latticework and for cleaning tools, such as broomsticks.

For cleaning tools of different kind there are handles made with different designs, e.g. ergonomically advantageous designs, and which are made of different materials, typically aluminium or wood.

Within the later years it has been more widespread to use synthetic material for making such handles. In order to save weight, handles for brooms, floor scrapers and other cleaning tools, for which is required a relatively long handle, are made as hollow handles produced by extruding thermosetting plastic material. However, using extrusion for making such handles means that the handle is made with a certain external diameter along the entire length of the handle. If such a tubular item is to be closed at one end it is common to shut off an open tube after the moulding process itself. Also, possible separate components, such as external fastening devices, mounting faces, handle facilities or suspension facilities, are retrofitted.

In order to change such a given handle profile, it is known to apply a film or a tubular stocking which is pressed on the handle as e.g. described in International patent application WO 02/34494 by Toft. Such a film or tubular stocking is typically made of a thermoplastic material, which also makes the handle more comfortable to hold on. Typically, polypropylene is chosen as this thermoplastic material.

In order to achieve satisfactory use of the handle for different tools, auxiliary means are to be fitted on the handle, e.g. enhanced non-skid surfaces, holder devices of auxiliary equipment, relief discs, or clamping devices for telescoping handles, where these separate components are mounted on the handle by means of welding, bonding or by means of rivets. However, this means that pockets and grooves appear in which dirt and bacteria may accumulate, which is a great problem for the food industry in particular, as it is of decisive importance in the food industry, e.g. slaughter houses that the tools are kept clean. Cleaning of the tools is effected by autoclave which is a cumbersome and expensive process. Also by pressed on, tubular threaded pieces for mounting tools there is great danger of accumulating dirt. It has appeared that the previously mentioned stocking described in International patent application WO 02/34494, which is pressed onto an aluminium handle, does not fulfil the requirements to light cleaning in the food industry in a satisfactory way, as an interspace remains at the transition between the end of the stocking and the handle in the order of magnitude of 0.1 mm where bacteria may accumulate and grow.

In general, however, it is known to make longer, tubular items that are closed at one end. For example, there is known a manufacturing method for a hockey stick described in International patent application WO 91/08803 by Motley. This gas injection technique, however, leads to items where the internal hole does not have a well-defined diameter. For example, such a technique cannot be used for making telescoping tubes. Similar problems are experienced with a related technique called liquid injection technique, where liquid, typically water, is injected together with the melted plastic mass.

Further techniques for moulding tubular items exist, e.g. mould blowing and spray blowing, which are used for thin-walled plastic bottles, e.g. shampoo containers or screw-capped lemonade bottles. Such a technique is described in U.S. Pat. No. 3,301,928.

In general it is also prior art to make handles with bottom at one end by injection moulding. Typically, these items are rather short due to lacking stability of the mould core in the hollow, tubular item during the mould process. Thus there may be made handles for hand tools, e.g. as described in European patent application EP 901 887 by Hoepfl or in U.S. Pat. No. 4,646,405 by Reinhold.

Long items may be injection moulded in moulds with fixed mould core. By using a fixed core during the mould process, a number of advantages are achieved. For example, it is ensured that the hold has a well-defined diameter and a well-defined positioning, also by very long items, whereby is achieved a well-defined weight distribution and weight of the item and also allowing use of the item for telescoping tubes. However, a number of problems have been recognised by injection moulding a long tubular item while using a mould core, if this mould core is not supported at both ends. One of the problems is non-uniform pressure action of the injected mass on the mould core, which makes the mould core to deflect to a side with a not centred hole as consequence. An example of how a fixed mould core is also an integrated part of the product is known from DK patent application 6426/89 by Sorensen.

In order to avoid bending of the mould core, there is required a very exact and uniform injection into the injection chamber so that a uniform force action is achieved over the whole circumference of the core. Furthermore it is an advantage that the core has very great bending strength. These two factors decide how long mould cores may be used in dependence of their cross-sectional area. In order to avoid that the mould core is deflecting to the side during injection of the plastic mass in the mould process, as described in International patent application WO 02/34494 by Toft, one has used to support the core at its free end during the injection moulding process. In order to manufacture a tube, which is closed at one end, the mould core is retracted a distance in order to release this from the support immediately before finishing the moulding. The method described in WO 02/34494 is used for making a tubular handle in another stabilising tube is inserted in order thereby to make a handle with a suitable handle. The stabilising tube is necessary as the handle itself is of too soft material to be used in long handles. The method of manufacturing described in this International patent application has appeared in practice only to work for handles with a maximum length of about 70 cm, as the mould core otherwise deflects in spite of this support at both ends. This method is therefore not suited for making long plastic items with high stability as desired with handles for cleaning tools.

Another known problem is that the plastic mass after solidifying binds to the mould core. When taking plastic items off long mould cores, it is therefore aimed at making the mould core conical so that the clamping force around the mould core of the solidified thermoplastic material causes the mould core to slide slightly up from the conical faces, thereby reducing the clamping force. Then the removal from the mould is effected, e.g. by the mould core being drawn backwards through a hole with the same cross-section as the mould core at its broadest cross-section, or that a plate with a hole of the same cross-section as the mould core at its broadest cross-section is pushed forward over the mould core and pushes the item off the mould core. Alternatively, removal from the mould by means of pressurised air is used, which is pumped through the mould core into the moulded item whereby this is released from the mould core. This technique is mentioned in the above described International patent application WO 02/34494. A pressurised valve for a mould core and a method of removal from mould is described in European patent application EP 862 980.

SUMMARY OF THE INVENTION

It is the purpose of the invention to provide an improved manufacturing method for injection moulding long, tubular items, where a mould core is used. It is also the purpose of the invention to provide improved handles, preferably for cleaning tools.

This purpose is achieved by a method for compact injection moulding of a long tubular thermoplastic item with one at least partly through-going hole longitudinally of the item, the method including providing an injection moulding machine with an mould with cavity having an internal volume that define the dimensions of the item, in which mould is provided a mould core for formation of the at least partly through-going hole in the item, where the mould core is suspended at its first end. The method includes injecting melted thermoplastic material into the cavity of the mould, solidifying the melted plastic material, opening the mould, and removing the item from the mould core where the method also includes rotating at least a part of the mould core during at least part of the injecting of the plastic moulding mass. The first end of the mould core is the end where the mould core is generally suspended in the mould, e.g. in a rotatable bearing. The first end may also directly be connected with the means providing rotation of the mould core.

By the core, or at least a part of the core, rotating during the injection moulding by a method according to the invention, it is possible to make tubular items where the length of the partly through-going hole in the item is ten, twenty or even more times the average diameter of the hole. For example, it is thereby possible to make stable handles for cleaning tools, such as brooms, with a length of e.g. one to two meter. Typically, the length of the hole will be at least twenty times the average diameter of the hole. Thus is achieved a considerable improvement of the prior art methods, as by using a rotating mould core it becomes possible to make tubular items with an internal cavity longitudinally of the item, which is centred, as the mould core is not subjected to displacing to the same extent during the moulding. The latter is particularly an advantage by telescoping handles.

By injection moulding under rotation of the mould core, the rotation is typically stopped right before solidification of the plastic mass.

In another embodiment, a central support of the mould core is provided at a free section of the mould core at a certain distance from the first end of the mould core in the mould, e.g. at the free end opposite the first end of the mould core.

Advantageously, the central support is provided at the beginning of injecting the melted plastic material into the mould, and where the mould core before finishing injection of the plastic material is released from the support to allow the melted plastic mass to fill the cavity between the internal wall of the mould and the free section of the mould core.

In a concrete embodiment of the invention, the support includes at least two pins bearing with each their first ends against the free section of the mould core at opposite sides of the mould core, where the pins are pulled out of the cavity of the mould core immediately before finishing the plastic injection for releasing the mould core from the support.

When the pins are retracted, they form part of the sides of the mould cavity, and the melted thermoplastic in the last stage of the injecting will fill up the holes formed by the pins before retracting. The pins may e.g. be actuated to and fro by means of hydraulic cylinders.

If the mould core is very long, plural sets of pins may inserted in the mould cavity for supporting the mould core at several points. Utilising pins or equivalent means may be applied generally for supporting the mould core, also without rotation of the core. Using more pins, however, means that after the mould process there are left more visible marks on the items, which is often undesired for aesthetic reasons and due to formation of pockets where possible dirt may accumulate. However, it is to be noted that marks from pins may be avoided if the area, where the marks are produced, is applied another polymer layer by moulding in a further mould step.

In practice, it appears that the best result is achieved by rotating the core. By rotation with relatively high rotational speed, high stability of the core is achieved, whereby the number of supports may be significantly reduced compared with non-rotating cores. In some cases it has appeared that by moulding even relatively long items, there is achieved sufficiently stability just by rotating the core, so that supporting the free end of the core is not necessary. In most cases, however, it is desirable and sufficient with one support near the end opposite the first end at which the mould core is suspended in the mould.

Rotating the mould during moulding where the mould core is suspended at one end and possibly supported by minimum two pins results in that the least radial forces will act on the mould core if it rotates at the centre of the cavity, why it will seek this position while rotating. By this solution it is preferred that the case is a mould core with a circular cross-sectional area. The rotating bearing prevents wear on the mould core and the pins during clamping the mould between the pins.

In a concrete embodiment, the mould core has circular cross-section and is provided with a rotating bearing, which is clamped between the at least two pins for supporting the mould core. The mould core includes a part that rotates in the cavity of the mould and inside the rotatable bearing during injection of the plastic mass. This occurs preferably until immediately before finishing the injecting, where the rotation is stopped and the pins are retracted for releasing the mould core from the support.

The embodiment with the pins may in some cases provide the item with external markings of all the used support pins. If these markings are undesired and the mould core only needs to be support at its outermost free end, the mould wall forming the outer side of the closed end of the item and the end of the mould core may be designed with corresponding and mutually engaging shapes so that the mould core is secured centrally so that the end of the mould core cannot move to any side during the moulding. Therefore, by the invention also the further concrete embodiment is provided, where the support includes a conical projection on the end wall of the mould and a corresponding conical socket on the mould core for receiving the conical projection, where the mould core is retracted immediately before finishing the plastic injection for releasing the mould core from the support. Alternatively, the conical projection may be retracted instead of the mould core. Furthermore, the mould core may be provided with a conical projection for reception in a corresponding conical socket.

For removing from the mould core, the mould core is provided with an internal duct for the passage of pressurised air, where the plastic item is removed from the mould core by blowing pressurised air through the duct and out between the mould core and the item. With an item being closed at one end, it is suitable to blow pressurised air in through the free end of the mould core, so that a pressurised air cushion is produced between the moulded, unilaterally closed thermoplastic item and the mould core, whereby the item slides off the mould core by the action of pressurised air.

In this case, the free end of the mould core is e.g. provided with an air venting valve closed via a spring when no overpressure is present in the mould core. By removal from the mould, overpressure is applied behind the valve, which then opens and lets the pressurised air pass into the surrounding moulded item. Such valves have been used for many years with moulding thermoplastic items, where casting problems have existed due to sticking of thermoplastic materials to the mould cavity, or where the items have been so thin or soft that normal ejector pins were unable to push the item out of the mould cavity.

By long tubular thermoplastic items with closed hole at one end, the pressurised air will distend the item that so it does not squeeze around the mould core, and the item will slide off the mould core on an air cushion. The air pressure is to be regulated in relation to the size of the forces with which the item are squeezing around the mould core, and the material thickness of the item is to be dimensioned for resisting this air pressure without bursting. An air pressure up to 40-50 bar is not unusual. By making friction on the mould core as small as possible and possibly having high temperature on the mould core itself, e.g. 70-130° C., this removal from the mould may be assisted on long mould cores.

A typical, long, tubular item according to the invention has a length which is at least 20 times the internal average diameter. The hole may be circular, but may also have other shapes, e.g. oval or polygonal, where, however, it is preferred that the hole does not have sharp edged cross-section, as it has appeared that the blowing off is more difficult with sharp edges. Furthermore, by rotation of the core it is an advantage with a circular cross-section of the core and thereby the hole.

The method according to the invention may advantageously be used for making pneumatic cylinders, scaffolding rods, structural elements for latticework, and for handles, e.g. for painting tools or cleaning tools, such as brooms. The manufacturing method according to the invention is particularly suited by making telescoping tubes, as by the invention there may be made injection moulded tubular items with a very well-defined internal hole diameter.

By making a tubular item by injection moulding of a thermoplastic polymer, it is possible to design it with varying external diameter and with e.g. a closed end. Besides, the tubular item, e.g. a handle, may be provided with holder devices, e.g. with a spherical holder device at one end, with relief discs for relieving the hand by heavy lifting or with other auxiliary equipment, without thereby providing grooves or pockets in which bacteria may accumulate.

A satisfactory cleaning of such a handle according to the invention may be achieved by high pressure cleaning or steam flushing, which is a very rapid and easy process particularly suited for the food industry.

An injection moulded handle according to the invention may also be designed with an ergonomically advantageous shape, which is another advantage of the invention. An ergonomically advantageous shape may not be achieved with e.g. thermosetting, extruded handles.

A thermoplastic, tubular item according to the invention may furthermore later be heated up and reshaped for optimising the shape of the handle. This is a further advantage of the invention, where consideration is made to the handle for achieving the shape which is most ergonomically advantageous. Also, this is not possible either with thermosetting plastic handles or e.g. handles of wood.

The many advantages connected with making a handle in thermoplastic polymer have until now been overlooked, primarily due to the lack of satisfactory manufacturing method for long tubular items. It is also to be noted that the material typically used for injection moulding, namely polypropylene, does not have an elastic modulus that is large enough, which means that a broomstick made in pure polypropylene is too soft. On the other hand, one may use polymers having a higher elastic modulus, e.g. polyamide. It is noted that thermosetting polymers by experience are not suited for injection moulding of long items.

A further advantage of the invention is that the tubular item may be produced in a simple way. This is achieved by the manufacturing material is a cheap thermoplastic polymer, e.g. polypropylene, which has been added a reinforcing material, e.g. a reinforcing material such as glass fibre and carbon fibre, Kevlar fibre, natural fibre, or mineral fillers like barium sulphate, talc powder or chalk. Also natural fibres, such as flax fibres, may be used for the invention. The advantage is that they have a relatively low weight.

In practice it has appeared that the modulus of elasticity is to be higher than the 1200 MPa being a typical magnitude for polypropylene without reinforcing material and that it is sufficient with a modulus of elasticity higher than 3000 MPa, however, preferably higher than 4000 MPa. This implies then that the tubular item, e.g. a broomstick, has sufficient elasticity so that it is not regarded as too soft in use. This also means that the item may be made hollow which is weight saving, an important aspect for the user in daily application. Furthermore, it is material saving to make such tubular items, e.g. handles.

When the tubular item according to the invention may be produced by injection moulding, some of the operations are saved which previously were necessary and cost-increasing by adapting the item for certain purposes, where the item is to be provided with e.g. a holder device for auxiliary equipment or a suspending device. An item according to the invention may e.g. be made with a further injection moulding step, where the item is moulded with thermoplastic rubber on, e.g. for attaining a smooth non-skid surface on the item. This injection moulding step may also comprise a holder device, e.g. a spherical holder at the end of the item, different holder devices for auxiliary equipment, a suspending device or e.g. an information tag or a company logo. Thereby is achieved a far cheaper production as we are speaking of fewer components and fewer assembling operations.

For some handles it is, for example, desired that the outer diameter varies over a relatively large area, e.g. it is desired that the handle is rather thick where one is holding the handle, while it is desired that the handle is rather narrow elsewhere on the handle. As described in the introduction, this has previously been solved by using a relatively narrow tube on which is provided a thickening polymer stocking as described in International patent application WO 02/34494. Hereby one achieved a handle that was relatively thick-walled, where holding was to be done about the handle. By injection moulding a handle according to the invention it may be chosen that the wall thickness does not have so large variation, which means reduction of material as well as of weight of the material.

An injection moulded tubular item according to the invention may be made with relatively thin walls so that the length of the hole through the hollow item is more than 10 times the average diameter of this hole, and preferably greater than 20 times the average diameter of the hole. The diameter of a hole in a handle for common use in cleaning tools will typically be between 18 and 30 mm, and also 32 mm. The length of such handles is usually between 0.4 and 2 m.

Much used for cleaning tools and also for painting tools are telescoping handles. These telescoping handles will particularly be difficult to keep clean. Therefore, it is also the purpose of the invention to indicate a telescoping handle which is easy to keep clean. This purpose is achieved with a handle provided with a collet chuck moulded in thermoplastic material with an external thread that interacts with a suitable swivel nut. When this swivel nut is tightened, the collet chuck will be tightened to a lesser diameter, whereby a tube surrounded by the collet chuck will be clamped. Such a collet chuck may be made by injection moulding in the same step as injection moulding of the handle, or in two step, where in the first step there is made a collet chuck with a number of fingers, e.g. two to eight fingers, and where in the next step there are moulded rubber pads between these fingers, whereby grooves and pockets that cannot be cleaned, are avoided. The thermoplastic rubber pads between the fingers are compressed when the swivel nut is tightened on the thread of the collet chuck. In that case, the rubber pads will press on the outer side of the sliding tube with high friction, which means for the user that it is not necessary to tighten the swivel nut so much as in the prior art telescoping handles, enhancing user friendliness of the handle according to the invention.

As a further means for preventing dirt and bacteria from accumulating in parts of the telescoping handle, the collet chuck is provided with a rubber lip at the end of the fingers in the collet chuck. This rubber lip is also injection moulded in a thermoplastic rubber material, whereby it is elastic and by melting together with the other injection moulded material without projections or pockets where bacteria or dirt may be collected. This rubber lip will in contact with the tube extending through the collet chuck and into the handle according to the invention. Also, this tube may be made by injection moulding like the handle. The handle will therefore, also in a telescoping embodiment, be liquid tight and thereby fulfil the demands made in the food industry for hygiene.

A further ground for making the handle watertight is that in a special embodiment it is used for waterflow through the handle. In such a case, the handle is to be designed hollow with holes at both ends.

By making a handle in thermoplastic materials, a further advantage is achieved. It will also be possible to recycle the material for other types of items. Since the whole handle and the needed holder devices are made in thermoplastic polymer, it will be possible to regranulate the handle and the devices moulded thereon for use in new melting and moulding processes. Thereby is achieved an environmentally friendly handle, which is a further purpose with the invention. It is noted that such recycling is not possible with thermosetting materials. By other current handles, dismounting, e.g. of polymer material from aluminium, is so costly that it is usually not used.

The thermoplastic rubber used is e.g. based on the known synthetics SEBS (styrene-ethylene/butyl-styrene) or EPDM (ethylene-propylene rubber).

BRIEF DESCRIPTION OF THE DRAWINGS

The invention will be explained further in connection with the drawing, where:

FIG. 3 shows a detail of the mould parts of the mould and a rotatable mould core which is supported by pins that steps on a rotatable bushing, FIG. 4 shows a broom with a handle according to the invention, FIG. 5 shows a detail of the handle, FIG. 6 shows a telescoping device in connection with a handle according to the invention, FIG. 7 shows the collet chuck for the telescoping device in greater detail, FIG. 8 shows the collet chuck in cross-section, and FIG. 9 shows a handle according to the invention with two layers of polymers.

DETAILED DESCRIPTION OF THE INVENTION

Figure 1:
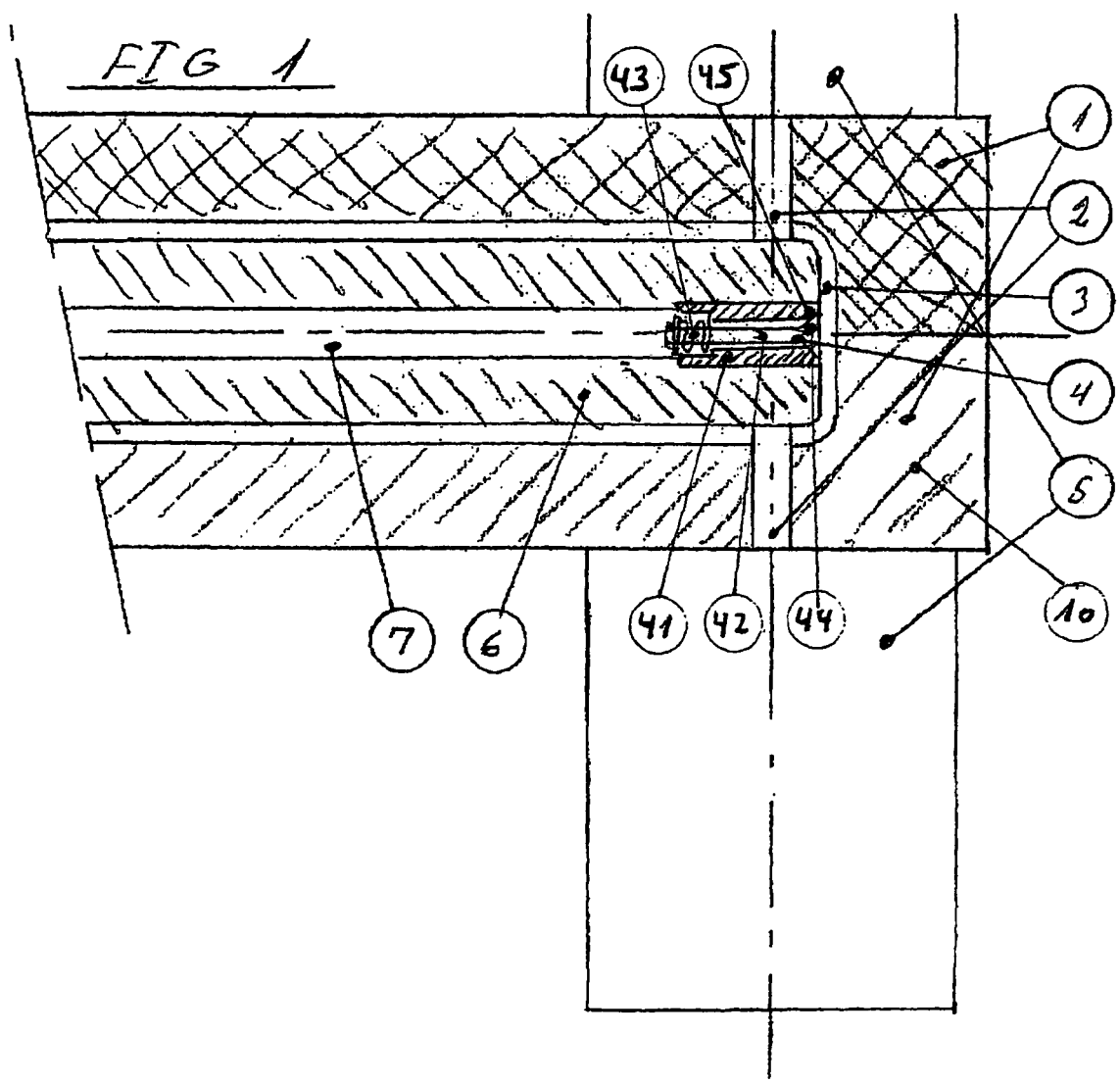
FIG. 1 shows a detail of the two mould parts and of a mould core inside which is supported and contains an air venting valve.

On FIG. 1 is shown the two mould parts 1 of the mould 10, which are closed together before moulding for forming a mould cavity 3. Inside this mould cavity 3 lies a mould core 6 which is to provide that the moulded item becomes hollow. This mould core 6 is supported by at least two support pins 2 which are drawn to and fro by means of hydraulic cylinders 5. The hydraulic cylinders 5 are retracted immediately before terminating the plastic injection. At the time when the cylinders are retracted, the mould cavity 3 is largely filled with plastic mass, after which mainly the volume of the pins 2 is only to be filled.

In the mould core 6 is internally provided an air venting valve 4 which is provide with pressurised air from an internal duct 7 in the mould core 6. The air venting valve 4 comprises a bearing 41 in which a piston 42 is disposed sliding in the longitudinal direction of the bearing 41. The piston 42 has a conical end 44 fitting tightly against a corresponding conical part 45 of the bearing 41. A spring 43 secures the piston 42 in the bearing 41 with the conical end 45 of the piston pressed against the corresponding conical part 44 of the bearing 41. When the valve 4 is closed, the plastic mass may therefore not be pressed into the inner duct 7. High pressure from the plastic mass will press the piston 42 against the conical part 45 of the bearing 41, whereby is achieved a more efficient sealing of the valve 4. After solidification of the plastic item, formation of overpressure in the inner duct 7 of the mould core will displace the piston 42 outwards in the bearing 41 whereby pressurised air may pass in the interspace between the bearing 41 and the piston 42 in order thereby to distend the injection moulded item and to fill the space between the plastic item and the mould core 6, whereby the plastic item slides off the mould core 6.

Figure 2:
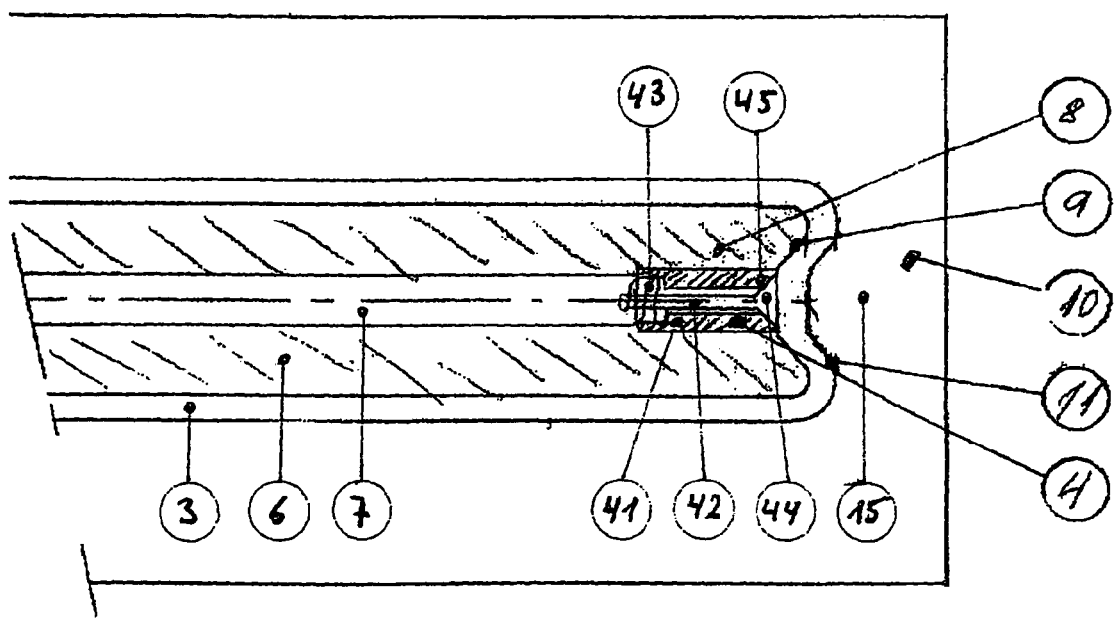
FIG. 2 shows a detail of one mould part of the mould and a mould core, which has a socket at its end so that the mould core is centring when pressed forward against the corresponding conical projection of the mould cavity.

On FIG. 2 is shown an alternative embodiment. The mould core 6 may be displaced to and fro in the cavity 3 via a hydraulic cylinder. The mould core 6 is provided with a conical socket 9 at the free end corresponding to a conical projection 11 of the mould core. When the mould core 6 is pressed towards the end wall 15 of the mould cavity 3, the conical socket 9 will receive the conical projection 11, whereby the mould core 6 becomes locked in a centred position.

If the mould core 6 rotates axially during the moulding, e.g. by means of a motor, there is a certain danger that the mould core 6 will slide off the two pins 6, as shown on FIG. 1. On the contrary, the cylindrical device shown on FIG. 2 acts according to purpose, also during rotation, though it is an advantage if the conical embodiment is provided with a rotatable bearing so that friction between the socket 9 of the mould core and the corresponding part 11 is avoided.

When rotating the core 6, the embodiment shown on FIG. 3 is advantageous. By activation of hydraulic cylinders 5, the support pins 2 may be squeezed against a rotatable bearing 12 with external bushing 13, which is secured between the support pins 2, while the mould core 6 rotates inside the rotatable bearing 12 with its end piece 14.

FIG. 4 shows a handle 21 according to the invention with a grip 35 and a holder device 30 for auxiliary equipment 31, for example a broom. The handle 21 according to the invention is advantageously hollow as shown on FIG. 5, where a longitudinal hole 17 extends through the handle 21 with a wall 24, where the wall 24 is made of a thermoplastic polymer.

An advantageous grip, which is very user friendly, may e.g. consist of ball-shaped holder 32 at the end of the handle 21. Furthermore, the handle 21 may be provided with a ring 33 preventing the handle 21 from sliding out of the user's hand, when the handle 21 is in an approximately vertical position, e.g. by window cleaning or when painting facades. The ring 33, as well as the ball-shaped holder 32, are injection moulded onto the handle, preferably in a thermoplastic rubber. As the rubber by injection moulding on the polymer material of the handle 21 fuses with the handle 21, pockets or grooves at the transition from the grip 35 to the handle 21 are avoided. On FIG. 4 is shown that the holder device 30 for the auxiliary equipment 31 is separate and fitted on the handle 21, e.g. by gluing, plastic welding, or friction welding under rotation. However, it is also possible to make the handle 21 by injection moulding so that already after the injection moulding it is provided with such a holder device at this end.

On FIG. 9, the grip 35 is shown in cross-section with the handle 21 material 24 surrounding the hole 37 and surrounded by the other injection moulded material 25. The two polymer materials 24 and 25 are fused together, whereby liquid or bacteria cannot accumulate in a possible interspace between the two polymers.

FIG. 6 shows handle 21 according to the invention with a telescoping device. The handle 21 is hollow with an internal diameter which is larger than the outer diameter of the tube 27 so that the tube 27 may be accommodated displacing in the handle 21. A clamping device 34 is used for locking the internal telescope tube 27 in relation to the handle 21. The clamping device 34 includes a swivel nut 23 which e.g. may be injection moulded in a thermoplastic polymer. This swivel nut has a conical, internal thread 19 that engages an external thread 20 of fingers 26 in extension of the handle 21. When the swivel nut 23 by rotation is screwed relative to the fingers 26, the conical thread 19 of the swivel nut will press the fingers 26 against the tube 27. Thereby friction between the fingers 26 and the tube 27 is increased, and the tube 27 is locked in relation to the handle 21. Alternatively, the thread 19 of the swivel nut 23 may be non-conical, while the thread 20 of the fingers is conical, whereby the same effect is achieved.

As it appears from FIG. 8 showing the fingers, tube 27 and swivel nut 23 in cross-section, the interspaces between the fingers 26 may be filled with rubber pads 28. By tightening the clamping device through rotation of the swivel nut 23 on the thread 20, these pads 28 will be pressed together. The elastic deformation of these pads 28 will lead to rubber material being pressed towards the tube 27 by the pads 28, resulting in increased friction against the tube 27. For the user, this means greater user friendliness, as it is not necessary to tighten the swivel nut 23 so much as required in prior art telescope handles. Furthermore, the collet chuck including the fingers 26 and the pads 28 is waterproof so that water cannot penetrate into the interspace between the tube 27 and the handle 21. As a further waterproof measure, the collet chuck may advantageously be provided with a rubber lip 29 extending around the end of the collet chuck 34 for pressing against the outer side of the tube 27. The tube 27 may advantageously be made in the same way as the handle 21.

It is to be noted that the spherical holder 32 shown on FIG. 4 may be supplemented with or substituted by a suspension means, e.g. a hook or a hole.

It is to be noted, that it is not possible to injection mould thermoplastic rubber on existing handles, e.g. aluminium handles or thermosetting handles that are hollow, as so high pressure is to be applied for moulding that these handles will collapse in such cases. That it is possible to use this moulding of thermoplastic rubber on a handle according to the invention is achieved in that already at the injection moulding of the hollow handle according to the invention there is provided a mould core in the shape of a mandrel inside the handle, preventing the hollow handle from collapsing. The invention is thus an overall solution meeting a number of purposes in a simple way.

Prejudices in the industry has hitherto not led to injection moulding of handles, e.g. broomsticks, as the method in general is not regarded as being advantageous for this kind of long items. Extruding thermosetting material is e.g. regarded as being much cheaper. However, the additional properties attained by the invention, namely that holder, non-skid surfaces or holder devices for auxiliary equipment can be moulded on handles, imply that the overall solution is far more advantageous and cheap than traditionally made products, where the handle itself is maybe cheap to make, but where mounting of the items on the handle in the final stage is very expensive, not suited for recycling and unsuitable for the food industry.

It is within the scope of the invention that a handle according to the invention may also be provided with devices not being of thermoplastic polymer, however, with regard to recycling it is preferred that the entire handle including holder device is made of thermoplastic polymer.

What is claimed is:

1. A method for compact injection moulding of a long tubular thermoplastic item with one at least partly through-going hole longitudinally of the item, the method including:

providing an injection moulding machine with an mould with cavity having an internal volume that defines the dimensions of the item, in which mould is provided a mould core for formation of the at least partly through-going hole in the item, where the mould core is suspended at its first end, injecting melted thermoplastic material into the cavity of the mould, solidifying the melted plastic material, opening the mould, removing the item from the mould core, providing a central support of the mould core at a free section of the mould core at a certain distance from the first end of the mould core in the mould at the beginning of the injection of the melted plastic material into the mould, and where the mould core before finishing the injection of the plastic material is released from the support for allowing the melted plastic mass to fill the cavity between the internal wall of the mould and the free section of the mould core, rotating at least a part of the mould core during at least part of the injecting;

wherein the support includes a conical projection on the end wall of the mould and a corresponding conical socket on the mould core for receiving the conical projection, where the mould core is retracted immediately before finishing the plastic injection for releasing the mould core from the support.

2. A method according to claim 1, wherein rotation of at least part of the core occurs during injection of the plastic mass until immediately before the finishing of the injection where the rotation is stopped.

3. A method according to claim 1, wherein the mould core is provided with an internal duct for the passage of pressurised air, where the plastic item is taken off from the mould core by blowing pressurised air through the duct and out in the free end of the mould core, so that a pressurised air cushion is produced between the moulded thermoplastic item and the mould core, whereby the item slides off the mould core by the action of pressurised air.

4. A tubular item made by a method according to claim 1, wherein the material of the item includes at least one thermoplastic polymer.

5. A tubular item according to claim 4, wherein at least one of the polymers have a modulus of elasticity greater than 3000 MPa measured according to the standard ISO 178.

6. A tubular item according to claim 4, wherein the length of the partly through-going hole in the item is at least twenty times the average diameter of the hole.

7. A tubular item according to claim 6, wherein the diameter of the hole is between 18 mm and 32 mm.

8. A tubular item according to claims 4, wherein the tubular item is a handle provided with a collet chuck moulded in thermoplastic material with an external thread and a swivel nut with internal thread intended for interacting with the external thread for clamping a tube enclosed by the hollow handle, the tube being telescopingly slidable in the handle.

9. A tubular item according to claim 8, wherein the collet chuck is provided with fingers of thermoplastic polymer with thermoplastic rubber pads between the fingers for squeezing together against the tube by tightening the swivel nut on the external thread.

10. A tubular item according to claim 9, wherein the collet chuck has a thermoplastic rubber lip at the end of the fingers.

11. A mould with mould core configured for rotation in the mould including means for supporting the mould core at a certain distance from its rotatably suspended end in order to achieve higher stability of the core during plastic moulding, wherein the means for supporting the mould core is configured to establish support of the core in the beginning of injection and configured to stop support of the core during injection, wherein the support includes a conical projection on the end wall of the mould and a corresponding conical socket on the mould core for receiving the conical projection, and wherein the mould comprises means for retracting the mould core immediately before finishing the plastic injection for releasing the mould core from the support.

12. A mould according to claim 11, wherein the means for supporting includes at least two pins for bearing with each their first ends against the free section of the mould core, where the mould comprises means for pulling the pins out of the cavity for releasing the mould core from the support.

13. A mould according to claim 12, wherein the mould core has circular cross-section and is provided with a rotating bearing which is clamped between the at least two pins for supporting the mould core, where the mould core includes a part that is configured to rotate in the cavity of the mould and inside the rotatable bearing during injection of the plastic mass until immediately before finishing the injecting, where the mould core is configured to stop rotation.

14. A mould according to claim 11, wherein the mould core is provided with an internal duct for the passage of pressurised air and means for blowing pressurised air through the duct and out in the free end of the mould core to take off the plastic item by the action of the pressurised air.

* * * * *